United States Patent [19]
Vogt et al.

[11] Patent Number: 4,560,896
[45] Date of Patent: Dec. 24, 1985

[54] COMPOSITE SLOT INSULATION FOR DYNAMOELECTRIC MACHINE

[75] Inventors: George H. Vogt, Hendersonville, N.C.; Scott K. Derderian, Salem, Mass.

[73] Assignee: General Electric Company, Lynn, Mass.

[21] Appl. No.: 656,571

[22] Filed: Oct. 1, 1984

[51] Int. Cl.⁴ .......................... B32B 3/24; H02K 3/34
[52] U.S. Cl. .................................. 310/215; 428/122; 428/137; 428/140; 428/138
[58] Field of Search ............... 428/122, 140, 137, 138; 310/215

[56] References Cited
U.S. PATENT DOCUMENTS 3,222,769 12/1965 Le Plae .......................... 428/122 X
4,321,498 3/1982 Vogt ..................................... 310/215
4,473,765 9/1984 Butman et al. ...................... 310/215

Primary Examiner—Alexander S. Thomas
Attorney, Agent, or Firm—James W. Mitchell

[57] ABSTRACT

In a dynamoelectric machine, the rotor comprises a solid steel drum formed with axially extending channels which carry electrically-conductive windings. These windings are electrically insulated from the rotor body by so-called slot insulation. The present invention proposes an integrally formed composite insulation comprising aramid paper slot armor and an epoxy-glass sub-slot cover.

6 Claims, 2 Drawing Figures

COMPOSITE SLOT INSULATION FOR DYNAMOELECTRIC MACHINE

BACKGROUND OF THE INVENTION

This invention relates to dynamoelectric machines and, in particular, to dynamoelectric machines of the type including a rotating field comprising electrically conductive windings disposed in a plurality of axially extending slots.

The rotating field of a dynamoelectric machine includes a rotor body having a plurality of axially extending slots into which the electrical windings are inserted. The rotor body is generally a steel material whereas the rotor windings comprise a plurality of copper wires. In a direct-cooled dynamoelectric machine each slot may further include an axially extending sub-slot for ventilation and cooling. The direct-cooled machine is one which is cooled directly by the atmosphere in which it is disposed; e.g., air or hydrogen. The sub-slots are part of a ventilation scheme, known in the art, for transferring gas coolant axially along the rotor. Each slot also includes provision for the radial flow of gas coolant primarily through ventilation slots in the windings.

In the aforementioned machine it is necessary to electrically insulate the rotor windings from the rotor body such insulation taking the form of non-conductive "slot armor". One such insulation is shown in U.S. Pat. No. 4,321,498 to Vogt and assigned to the assignee of the present invention. In that patent herein incorporated by reference, it is suggested that a preferred embodiment of the invention would include a pair of electrical insulating members (slot armor), each member comprising a radially extending portion terminating in a base leg, the electrically insulating members disposed in each slot so that the radially extending portions are adjacent opposite slot walls and the base legs extend towards on another. In addition, there is an axially extending base (sub-slot cover) having opposite sides formed with axially extending grooves for accepting therein each opposite base leg whereby an interlocking joint is formed between the sub-slot cover and the slot armor. It is further suggested that both the sub-slot cover and the insulating slot armor disposed adjacent the slot walls would be formed from glass laminate material.

The applicants have found it desirable to use an aramid paper such as Nomex (trademark, DuPont Company) as an insulating material for the slot armor. However, in following the teaching of the previous U.S. Pat. No. 4,321,498 they have found that there is a lack of rigidity which occurs in the 90° bend at the interlocking section of the insulating member and the base member. Under centrifugal load, the slot armor will migrate up the slot wall pulling away from the interlocking section of the sub-slot.

Aramid paper is presently used in conventionally-cooled machines only. Conventionally-cooled machines are described as other than direct-cooled machines. Conventionally-cooled machines are machines wherein cooling of the windings occurs by transfer of heat from the windings through the body of the rotor and then into the cooling medium. In the direct-cooled machine, the cooling medium is passed directly through the windings. Aramid paper will exhibit dimensional instability and can increase axially in length as much as one percent under changing conditions of relative humidity. Therefore, even U-shaped aramid paper with punched ventilation slots has been avoided in direct-cooled fields because changes in humidity can cause the register of the ventilation slots for the sub-slot cover-slot armor and copper to become misaligned, thus reducing the area of cooling paths.

It is therefore an object of the invention to provide an improved slot insulation for a dynamoelectric machine which includes aramid paper as the slot wall insulation.

It is another object of the invention to provide an improved slot insulation for a dynamoelectric machine which is a composite of aramid paper side-wall insulation and a glass laminate and aramid paper base member.

It is a further object of the invention to provide a composite slot insulation for a dynamoelectric machine wherein the base member controls and renders rigid the tendency of the aramid paper to grow.

The novel features believed characteristic of the present invention are set forth in the appended claims. The invention itself, however, together with further objects and advantages thereof, may best be understood with reference to the following description taken in conjunction with the appended drawings.

SUMMARY OF THE INVENTION

In accordance with the foregoing objects of the invention, a slot insulation (slot armor) is formed to be inserted along the axial length of a winding slot. The slot insulation is inserted into the slot and the coils are thereafter laid into the slot so as to be electrically insulated from the rotor body. The use of an aramid paper integrally formed in conjunction with the glass laminate base as a slot insulation provides the advantage of increased temperature capability at a substantially reduced cost over a slot insulation entirely comprised of a glass laminate. When the aramid paper is part of a glass-epoxy composite structure the problems associated with dimensional changes are eliminated due to the rigidity of the glass-epoxy.

DETAILED DESCRIPTION OF THE INVENTION

Figures 1, 2:
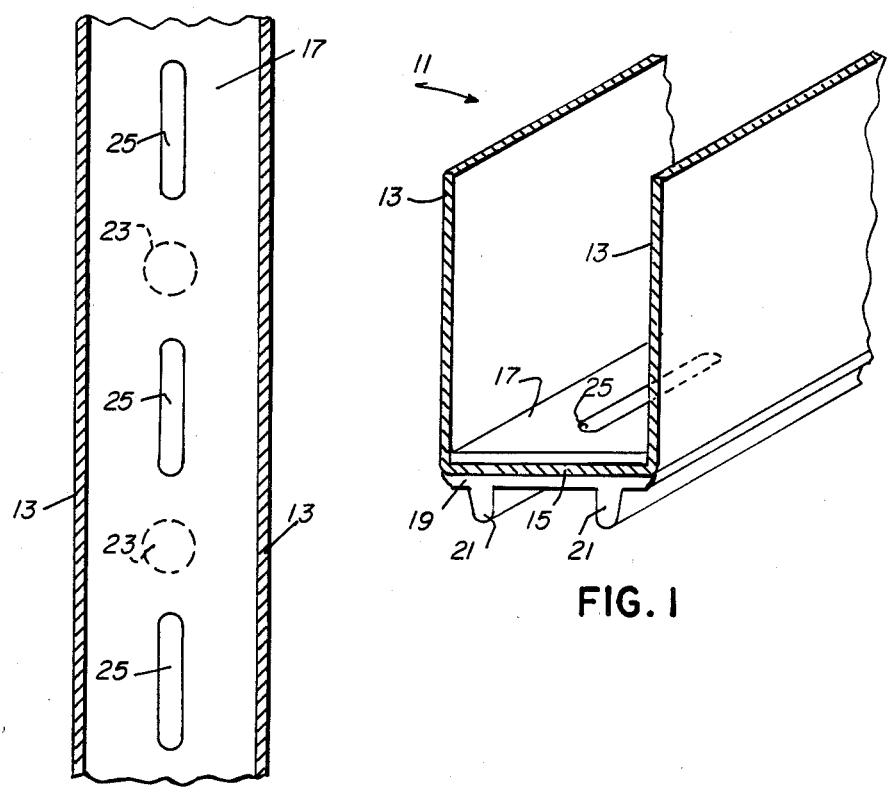
FIG. 1 is orthogonal representation of the composite slot armor.
FIG. 2 is a plan view of the composite slot armor.

In FIG. 1, the arrow 11 generally designates a composite aramid paper slot armor and glass laminate sub-slot cover. The slot armor is comprised of axially and radially extending side-walls 13 joined together by radially inner, axially extending base portion 15 to form a "U"-shaped channel. The sub-slot cover comprises planar outer layer 17 (with respect to the rotor centerline) and a planar inner layer 19. As is taught by U.S. Pat. No. 4,321,498 the planar inner layer may include axially extending fins 21 although this is strictly optional with respect to the present invention.

Referring to FIG. 2, which is a plan view of FIG. 1, in addition to the foregoing construction, the aramid paper is formed with spaced-apart holes 23 which allow the inner and outer planar layers 17 and 19 respectively of the sub-slot cover to be bonded to one another as well as to the aramid paper base portion 15 inserted therebetween. Ventilation slots 25 are thereafter machined into the slot armor sub-slot composite.

The method of manufacture is as follows. Single sheets of 0.030 inch aramid paper (DuPont Nomex 410)

are hot-formed into a "U"-shaped channel. Epoxy-glass (3M Scotchply 1009-26) available from 3M Company, is compression molded to the aramid paper to form the radially outer layer 17 and the radially inner layer 19. Optionally the radially inwardly extending fins 21 may be formed in the molding of the composite. Prior to molding of the composite, holes 23 are spaced equidistantly in the slot armor base 15 between where the ventilation slots 25 are positioned to further enhance bonding between the upper and lower planar layers. The ventilation slots 25 are machined after the composite is formed.

In summary, a new a useful article is described namely a composite slot armor and sub-slot cover 11 wherein the slot armor comprising parts 13 and 15 is aramid paper and the sub-slot cover 19 is glass laminate. The specific one-piece integral molded construction provides stability to the moisture-sensitive aramid paper thus permitting its use in a direct-cooled machine. The use of an aramid paper in conjunction with the glass laminate base as a slot insulation provides the advantage of increased temperature capability (up to 220° C.) at a substantially reduced cost over a glass laminate slot insulation. Because the slot insulation and the sub-slot cover are integrally molded there is no distortion between the ventilation slots in the aramid paper and the ventilation slots through the glass laminate. Also since the slot insulation is now of one-piece construction, that is a "U"-shaped channel, there is no tendency of the slot insulation to migrate up the walls of the dynamoelectric machine.

The "U"-shaped channel is formed with holes in its base portion such that during the molding process the upper and lower planar surfaces are molded to one another as well as to the aramid paper.

The method of manufacture includes the steps of forming a "U"-shaped aramid paper. Forming holes in the base portion of the aramid paper. Compression molding the upper and lower surfaces to the base portion to form a composite integral combination slot armor and sub-slot cover. Machining ventilation slots in the composite.

While there has been shown what is considered to be a preferred embodiment of the present invention of the modifications may occur to those having skill in the art. It is intended to cover in the appended claims all such modifications which fall within the true spirit and scope of the claims.

What is claimed is:

1. A composite slot armor and sub-slot cover for a dynamoelectric machine comprising:
   slot armor including a "U"-shaped aramid paper channel having a base portion including a plurality of axially spaced apart holes formed therethrough;
   a sub-slot cover including epoxy-glass layers formed integrally with the base portion of the "U"-shaped channel; and,
   axially elongated ventilation slots formed through the base portion and the epoxy-glass layers.

2. The composite article recited in claim 1 wherein the epoxy-glass layers are on each side of the base portion sandwiching the base portion therebetween.

3. The composite article recited in claim 1 wherein the aramid paper is Nomex.

4. The composite article recited in claim 3 wherein the epoxy-glass is Scotchply.

5. A composite slot armor and sub-slot cover for a dynamoelectric machine rotor having a plurality of axially extending slots each slot having radially extending sidewalls; the slot armor and sub-slot cover comprising:
   slot armor including a "U"-shaped aramid paper channel; and,
   a sub-slot cover including epoxy-glass layers formed integrally with an axially extending base portion of the slot armor; the base portion of the slot armor formed with spaced-apart holes allowing bonding between the epoxy-glass layers.

6. The article recited in claim 5 wherein the base portion of the slot armor and the epoxy-glass layers are formed with axially elongated ventiliation slots.

* * * * *